(12) United States Patent
Ono

(10) Patent No.: US 8,830,184 B2
(45) Date of Patent: Sep. 9, 2014

(54) IMAGE DISPLAYING DEVICE, IMAGE DISPLAYING METHOD, AND PROGRAM FOR DISPLAYING IMAGES

(75) Inventor: Ryo Ono, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 490 days.

(21) Appl. No.: 12/889,984

(22) Filed: Sep. 24, 2010

(65) Prior Publication Data

US 2011/0074716 A1 Mar. 31, 2011

(30) Foreign Application Priority Data

Sep. 29, 2009 (JP) ................................. 2009-224966

(51) Int. Cl.
*G06F 3/041* (2006.01)
(52) U.S. Cl.
USPC .......................................................... 345/173
(58) Field of Classification Search
None
See application file for complete search history.

(56) References Cited

U.S. PATENT DOCUMENTS

| 7,800,592 | B2 | 9/2010 | Kerr et al. | |
|---|---|---|---|---|
| 2006/0197750 | A1* | 9/2006 | Kerr et al. | 345/173 |
| 2007/0063976 | A1 | 3/2007 | Oga | |
| 2007/0103454 | A1* | 5/2007 | Elias | 345/173 |
| 2009/0231288 | A1* | 9/2009 | Liao | 345/173 |
| 2009/0315834 | A1* | 12/2009 | Nurmi et al. | 345/173 |
| 2010/0222110 | A1* | 9/2010 | Kim et al. | 345/173 |

FOREIGN PATENT DOCUMENTS

| JP | 11-353115 | 12/1999 |
|---|---|---|
| JP | 2008-532185 | 8/2008 |
| JP | 2009-187290 | 8/2009 |
| JP | 2010-146506 | 7/2010 |
| WO | WO 2005/010740 | 2/2005 |

OTHER PUBLICATIONS

Japanese Official Action—2009-224966—Mar. 5, 2013.
Erh-Li Early Shen et al., "Double-side multi-touch input for mobile devices," CHI EA '09, ACM, U.S.A., pp. 4339-4344, Apr. 9, 2009. ISBN: 978-1-60558-247-4.

* cited by examiner

*Primary Examiner* — Joe H Cheng
*Assistant Examiner* — Kwin Xie
(74) *Attorney, Agent, or Firm* — Young & Thompson

(57) ABSTRACT

Disclosed is an image displaying device including a first touch panel arranged on a display screen and generating first coordinate information representing a first coordinate pair denoting the location of a touch on the panel surface; a second touch panel arranged at the rear of the display screen and generating second coordinate information representing a second coordinate pair denoting the location of a touch on the panel surface; and a control unit detecting concurrent touches on the surfaces of the first and second touch panels and, if the concurrent touches are detected, detecting coordinate pairs overlapping between the first coordinate pairs and the second coordinate pairs to determine whether or not the overlapping coordinate pairs exist in a number not lower than specified. A method of and a program for displaying an image on such an image displaying device are also disclosed.

12 Claims, 12 Drawing Sheets

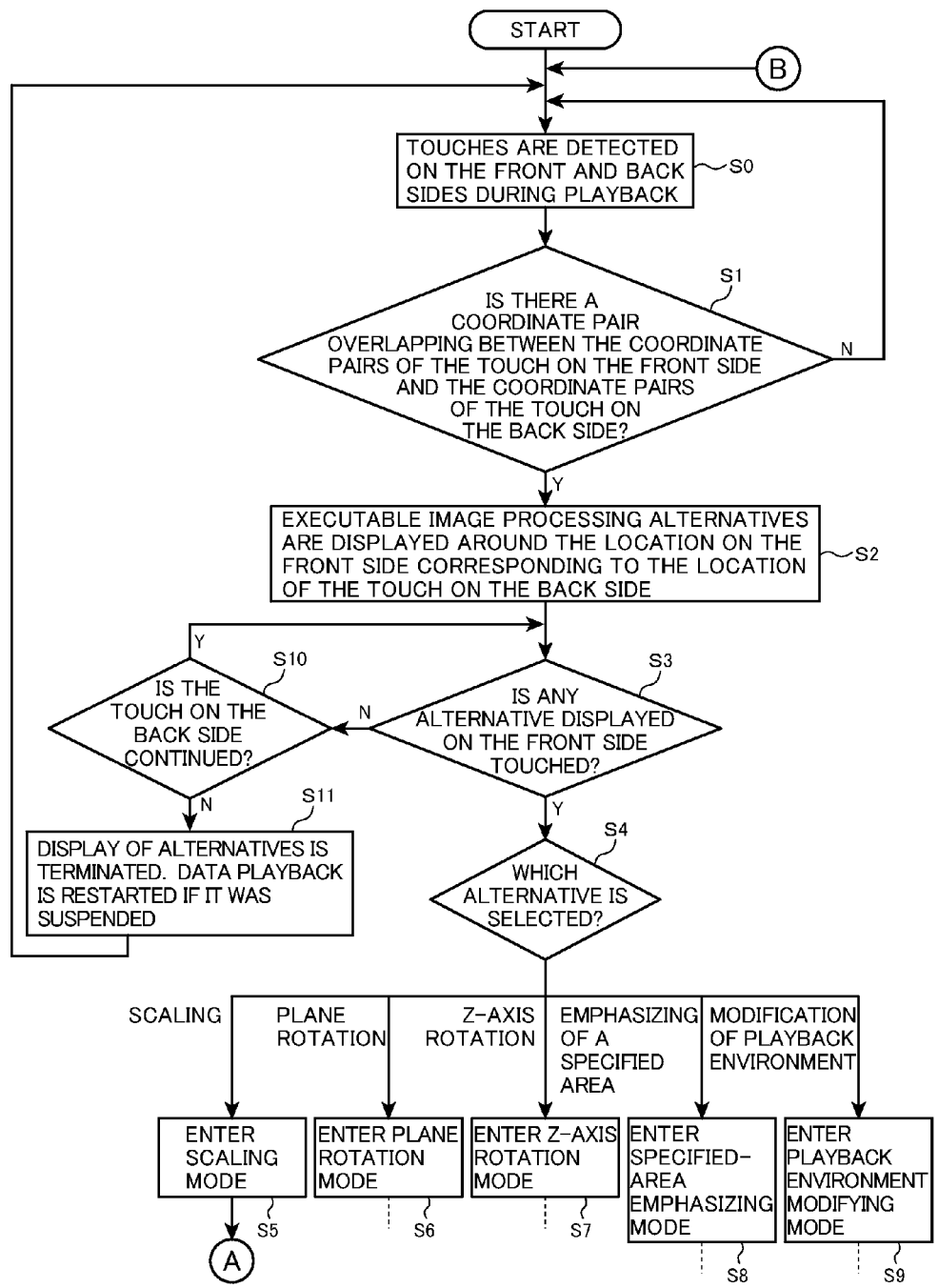

IMAGE DISPLAYING DEVICE, IMAGE DISPLAYING METHOD, AND PROGRAM FOR DISPLAYING IMAGES

BACKGROUND OF THE INVENTION

The present invention relates to image displaying devices, methods and programs for manipulating a displayed image or operation screen by means of a touch panel.

During the playback of static image data or video data on a conventional terminal (e.g., a portable audio player having an image playback function, a cellular phone, a digital photo frame, a digital camera, or a digital video camera) provided with a touch panel, such operations as image selection, start and pause of playback, or scaling and rotation of images may be instructed by means of the touch panel provided on a screen.

In that case, instructions are to be given with a user's finger acting on the screen having a played-back image and so forth displayed thereon, and an acting finger will block the image and so forth from view. This causes a problem if an image is scaled up by designating a point in the image as the center of enlargement, for instance, in that an expected point cannot be designated accurately because the image is hidden by the acting finger.

In this regard, JP 11-353115 A discloses a position input device in which a displayed character can be inverted in color and selected as such by drawing out a display unit from a digital video camera and operating a flat pad provided on the body of the camera or on the back side of the display unit with a finger inserted between the unit and the body.

WO 2005/010740 discloses a mobile information terminal in which a plurality of operation keys are disposed on the rear side of the terminal, the side opposite with the side on which a display surface is provided, and icons of the operation keys are arranged and displayed on the display surface as if the operation keys on the rear side were visible from the front side. It is stated in the document that the operator can perform an input operation while viewing the display surface owing to the change of any icon that is caused if the operation key corresponding to the relevant icon is half-depressed or touched.

SUMMARY OF THE INVENTION

In the device as disclosed in JP 11-353115 A, however, the finger operating the flat pad is hidden from the user behind the display unit and, consequently, it is not possible to, for instance, accurately select the icon of the operation of interest from multiple icons displayed on the screen. In addition, the position input device of JP 11-353115 A is not applicable in the case where an image displayed on a screen is subjected to scaling and so forth around a specified point as the center because, during such image processings, no characters to be inverted are displayed. If some marker or the like is displayed in such a case, it will block a displayed image and so forth from view. An accurate selection of icons could be achieved indeed by making the display unit translucent so that the operating finger may be seen. In that case, however, the cost of the device is increased, and the finger seen through the display unit also blocks a displayed image and so forth from view.

In the mobile information terminal as disclosed in WO 2005/010740, the operation keys or pads are used in order to merely select an operation attributed to a certain position if the operation pad located in the position is half-depressed or touched. In other words, the operation pad of WO 2005/010740 only serves as a switch and cannot be used as a pointing device for instructing the mobile information terminal to perform a processing requiring selection of any area of interest, such as partial zooming, on a displayed image and so forth.

An object of the present invention is to provide an image displaying device as well as method and program for image manipulation, each making it possible to manipulate displayed image data and so forth without blocking them from view, and accurately specify a focused area of displayed image data and so forth, by mounting touch panels on both the display side (front side) and the back side of the image displaying device and utilizing the characteristics of human digits.

In order to solve the problems as described above, the present invention provides an image displaying device, comprising: a display unit for displaying images; a first touch panel arranged on a display screen of the display unit and adapted to detect a touch on a surface of the first touch panel to generate first coordinate information representing a coordinate pair denoting a location of the touch; a second touch panel arranged at the rear of the display screen of the display unit and adapted to detect a touch on a surface of the second touch panel to generate second coordinate information representing a coordinate pair denoting a location of the touch; a control unit adapted to detect concurrent touches on the surfaces of the first and second touch panels based on the first coordinate information and the second coordinate information and, if the concurrent touches are detected, detect coordinate pairs overlapping between first coordinate pairs represented by the first coordinate information on one hand and second coordinate pairs represented by the second coordinate information on the other to determine whether or not the overlapping coordinate pairs exist in a number not lower than specified; and an image processing unit adapted to use one or both of the first coordinate information and second coordinate information to subject an image displayed on the display unit to image processing if the overlapping coordinate pairs are detected in a number not lower than specified.

According to the present invention, displayed image data and so forth can be manipulated without blocking them from view, and a focused area of displayed image data and so forth can accurately be specified. In addition, the manipulation is performed with two digits of one hand which are supporting the image displaying device on its front and back sides, that is to say, the manipulation is readily possible with only one hand. Moreover, the image displaying device of the present invention, as being provided with operation units on its front and back sides, can increase operational options as compared with a device provided with a touch panel only on one side.

BRIEF DESCRIPTION OF THE DRAWINGS

FIG. 8 is a flowchart showing an example of the image processing selection performed during the playback of image data;

DETAILED DESCRIPTION OF THE INVENTION

The image displaying device of the present invention for implementing the image manipulating method according to the present invention will be described below in detail based on the preferred embodiments as shown in the attached drawings.

Figure 1:
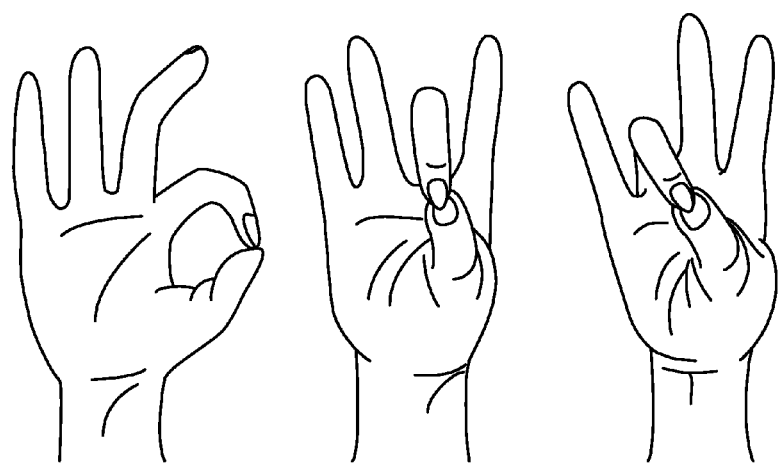
FIG. 1 is a diagram illustrating the characteristics of human digits.
Figure 2:
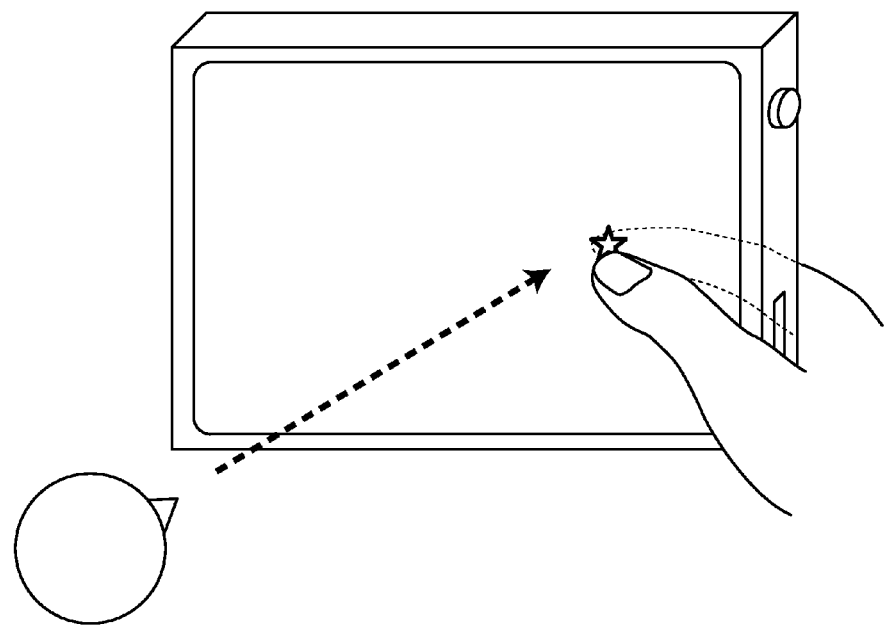
FIG. 2 is a diagram showing application of the characteristics of human digits to the image displaying device according to the present invention.

First of all, the characteristics of human digits utilized for the image manipulating method according to the present invention are explained. FIG. 1 is a diagram illustrating the characteristics of human digits. As shown in FIG. 1, the thumb and any finger (the index finger, the second finger, the third finger or the little finger) of one and the same hand can easily be joined together without viewing. With such characteristics being utilized, it is readily possible that any finger touches the back side of an image displaying device at the location corresponding in coordinate pair to the location at which the thumb touches the front side with a display unit provided thereon, as shown in FIG. 2. In other words, by touching the front side with the thumb and the back side with a finger of one and the same hand, any location (coordinate pair thereof) on the front side can easily be input from the back side while viewing the front side, without confirming the input location by turning the image displaying device upside down, or visually checking the situation of the finger behind the device by making the device transparent or video-shooting the finger.

Figure 3A:
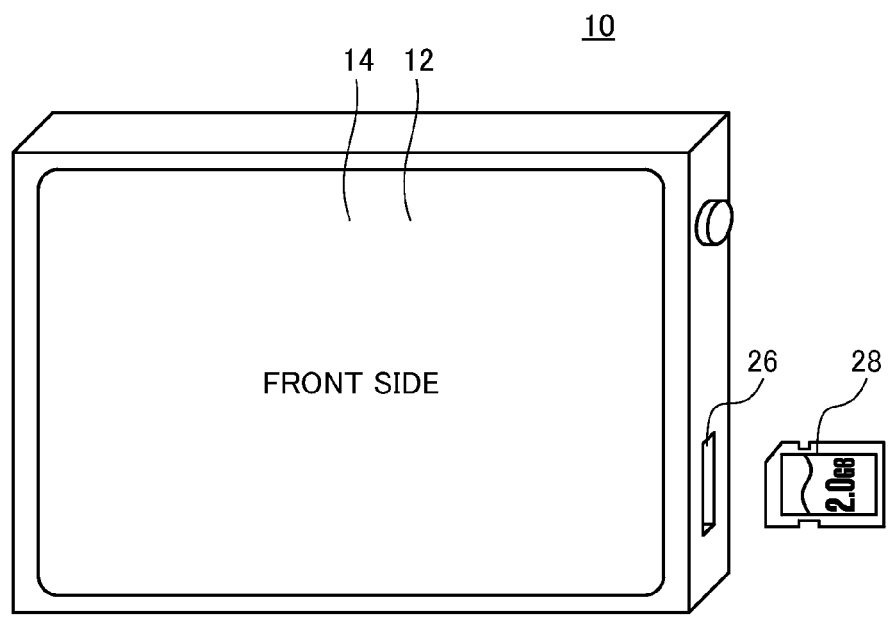
FIG. 3A is a perspective view of the image displaying device of the present invention from the front side thereof.
Figure 3B:
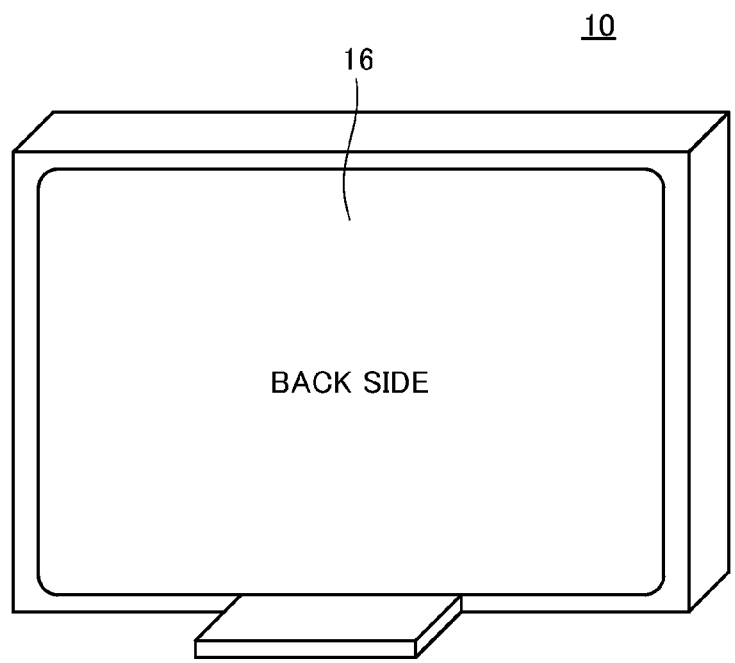
FIG. 3B is a perspective view of the image displaying device of the present invention from the back side thereof.

FIG. 3A is a perspective view of the image displaying device according to the present invention from the front side thereof, and FIG. 3B is a perspective view of the image displaying device according to the present invention from the back side thereof. An image displaying device 10 shown in FIG. 3A has a display unit 12 and a first operation unit 14 on its front side (display side), and is provided on its lateral side with a slot 26, in which a memory card 28 is to be inserted. As shown in FIG. 3B, a second operation unit 16 is provided on the back side of the image displaying device 10.

Figure 4A:
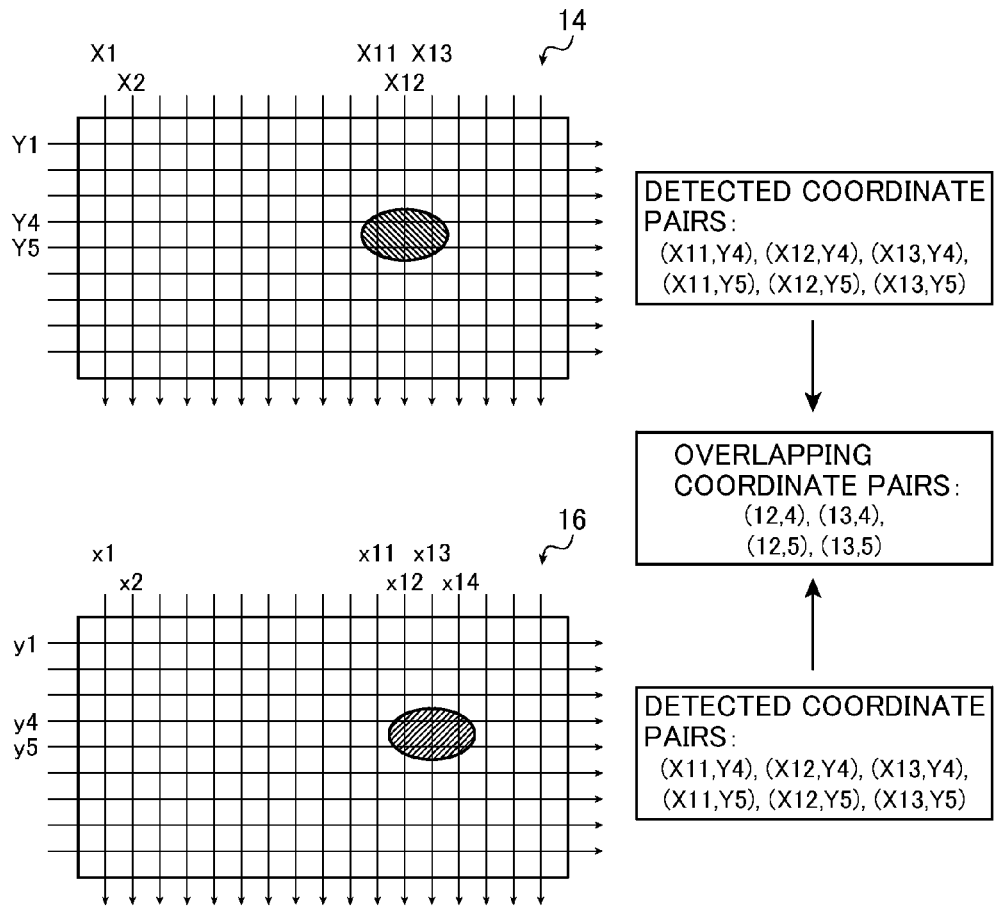
FIG. 4A is a diagram illustrating an exemplary process for finding the coordinate pair detected on a first operation unit and the coordinate pair detected on a second operation unit that are equivalent to each other.
Figure 4B:
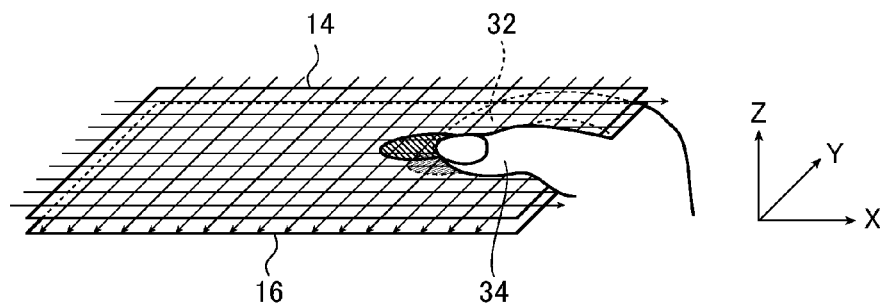
FIG. 4B is a diagram showing the relationship between the coordinate planes of the first and second operation units on one hand and the digits operating the operation units on the other.

FIG. 4A is a diagram illustrating an exemplary process for finding the coordinate pair detected on the first operation unit 14 and the coordinate pair detected on the second operation unit 16 that are equivalent to each other (the detected coordinate pairs denoting the locations of the touches of a thumb and a finger, respectively). FIG. 4B is a diagram showing the relationship between the coordinate planes of the first and second operation units 14 and 16 on one hand and the digits operating the operation units (a thumb 34 and an index finger 32, for instance) on the other.

As shown in FIG. 4A, the coordinate plane of the first operation unit 14 on the front side of the image displaying device 10 and the coordinate plane of the second operation unit 16 on the back side are corresponding to each other. Assuming that, in FIG. 4A, the x axes extend along the longitudinal edges of the units 14 and 16, the y axes extend along the transverse edges of the units 14 and 16, and the z axes extend along the depths of the units 14 and 16, the x and y axes of the coordinate plane of the first operation unit 14 are identical to those of the coordinate plane of the second operation unit 16. Consequently, a coordinate pair (X1, Y1) on the coordinate plane of the first operation unit 14 on the front side and a coordinate pair (x1, y1) on the coordinate plane of the second operation unit 16 on the back side, for instance, denote the locations on the front and back sides of the image displaying device 10 that are identical to each other in x and y coordinates (differing only in z coordinate; see FIG. 4B).

In FIG. 4A, the part of each operation unit that is touched by the operating thumb or finger is shown as hatched.

As seen from the figure, coordinate pairs (X11, Y4), (X12, Y4), (X13, Y4), (X11, Y5), (X12, Y5) and (X13, Y5) are detected on the hatched part of the first operation unit 14, while coordinate pairs (x12, y4), (x13, y4), (x14, y4), (x12, y5), (x13, y5) and (x14, y5) are detected on the hatched part of the second operation unit 16.

The coordinate pairs (X12, Y4), (X13, Y4), (X12, Y5), and (X13, Y5) are equivalent to the coordinate pairs (x12, y4), (x13, y4), (x12, y5), and (x13, y5), respectively, that is to say, the first operation unit 14 and the second operation unit 16 detect the coordinated pairs (12, 4), (13, 4), (12, 5) and (13, 5) in common.

By the fact that some coordinate pairs detected by the first operation unit 14 are equivalent to some detected by the second operation unit 16, it is indicated that the operating digits (the thumb 34 and the index finger 32) touch the front and back sides of the image displaying device 10, respectively, at the locations which are essentially corresponding to each other. In other words, it is possible to detect that the operating digits (the thumb 34 and the index finger 32) touch the front and back sides of the image displaying device 10, respectively, at the locations which are essentially corresponding to each other.

It may be considered that the image displaying device 10 is touched on its front and back sides at the locations which are corresponding to each other if there exists one coordinate pair as detected in common, or alternatively, if the coordinate pairs as detected in common are not lower in number than specified.

Figure 5:
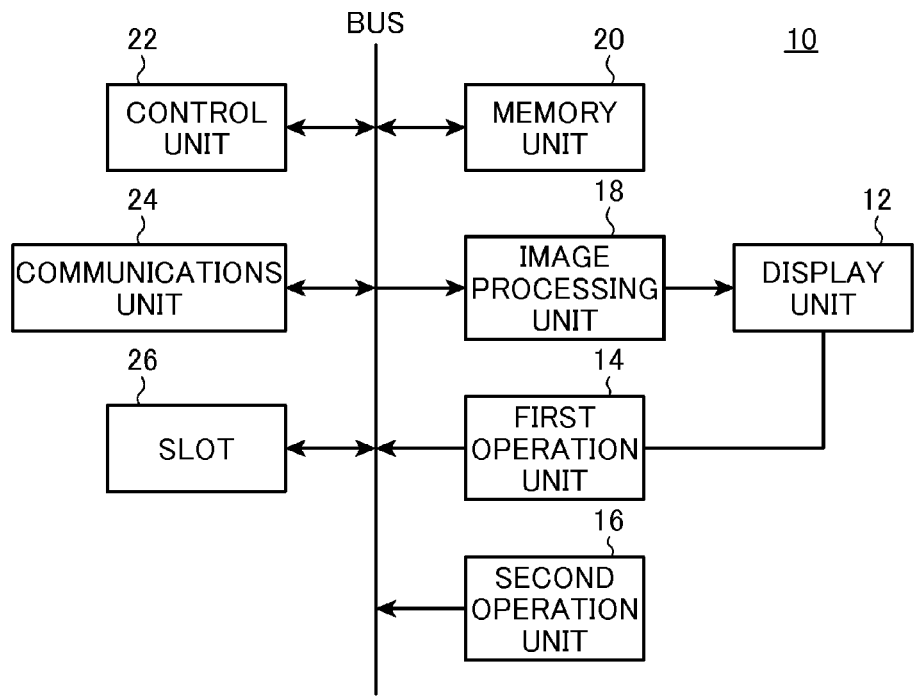
FIG. 5 is a block diagram of the image displaying device of the present invention.

FIG. 5 is a block diagram showing the system configuration of the image displaying device according to the present invention. The image displaying device 10 as shown in FIG. 5 is constructed of the display unit 12, the first operation unit 14, the second operation unit 16, an image processing unit 18, a memory unit 20, a control unit 22, a communications unit 24, and the slot 26.

The display unit 12 is the liquid crystal panel, organic electroluminescence panel, or the like which is adapted to display static images, videos, operation screens, and so forth. The display unit 12 is provided on the front side of the image displaying device 10, and receives the image data to be displayed from the image processing unit 18 as described later.

The first operation unit 14 is a touch panel as a pointing device, and is provided on a display screen of the display unit 12, whereupon an image and so forth displayed on the display unit 12 can be seen through the unit 14. The first operation unit 14 is used to manipulate an operation screen displayed on the display unit 12 and input image processing instructions.

If touched by a user's thumb as an operating means, the first operation unit 14 outputs, as a first operation signal, first coordinate information representing the coordinate pair (first coordinate pair) denoting the location at which the touch is detected (or representing the coordinate pairs denoting a plurality of locations within the touched surface part) along with other information (representing the contact pressure, for instance).

The first operation unit 14 may be any of various touch panels including capacitive ones and resistive ones.

The second operation unit 16 is a touch pad (a kind of opaque touch panel; herein also referred to as "touch panel") as a pointing device, and is provided on the back side of the image displaying device 10 (at the rear of the display screen of the display unit 12). The second operation unit 16 is of almost the same dimensions as the display unit 12 on the front side, that is to say, a location or the coordinate pair thereof (second coordinate pair) input to the second operation unit 16 corresponds to a location (the coordinate pair thereof) on the display unit 12, so that the manipulation of an operation screen displayed on the display unit 12 and the input of image processing instructions are also possible with the second operation unit 16.

The second operation unit 16 is similar in function to the first operation unit 14. To be more specific: If touched by a user's finger as an operating means, the second operation unit 16 outputs, as a second operation signal, second coordinate information representing the coordinate pair denoting the location at which the touch is detected (or representing the coordinate pairs denoting a plurality of locations within the touched surface part) along with other information (representing the contact pressure, for instance).

The second operation unit 16 may be any of various touch pads including capacitive ones and resistive ones.

It should be noted that the means for touching the first and second operation units 14 and 16 is not limited to human digits, and a touch pen or stylus may be used as an operating means as long as the touch thereof can be detected by the first and second operation units 14 and 16.

The image processing unit 18 receives a control signal from the control unit 22 as described later to generate the image data to be displayed on the display unit 12 in accordance with the received signal. The image data to be displayed is exemplified by an image (static image or video), an image subjected to image processing, and an operation screen.

Exemplary image processings performed in the image processing unit 18 include, apart from slideshow processing, scaling (zooming), plane rotation, z-axis rotation, emphasizing of a specified area, and modification of playback environment, such as fast forward and rewind.

The memory unit 20 is the semiconductor memory unit in which a control program used by the control unit 22 as described later, as well as image data and so forth input from the communications unit 24 or the slot 26 are stored, and which is used by the image processing unit 18 as a work area during image processing.

It is preferable that, in the memory unit 20, a flash memory constitutes the area for storage of a control program as well as image data and so forth, and a dynamic random access memory (DRAM) constitutes the work area.

The control unit 22 detects concurrent touches on the first operation unit 14 (first touch panel) and on the second operation unit 16 (second touch panel) based on the first operation signal (first coordinate information) output from the first operation unit 14 and the second operation signal (second coordinate information) output from the second operation unit 16, selects the image processing to be performed on an image or operation screen if the coordinate pairs overlapping between the first coordinate information and the second coordinate information are not lower in number than specified, and outputs a control signal to the image processing unit 18 so as to cause the unit 18 to perform the selected image processing.

In addition, the control unit 22 controls the memory unit 20, as well as the communications unit 24 and the slot 26 as described later. For instance, if an operation screen displayed on the display unit 12 is manipulated by a user, and first and second operation signals are output accordingly so as to instruct download of an image, the control unit 22 retrieves image data by means of telecommunications via the communications unit 24, and stores the data in the memory unit 20. If the memory card 28 as shown in FIG. 3A is inserted in the slot 26 and duplication of an image is instructed, the control unit 22 makes a copy of image data stored in the memory card 28 and stores the copy in the memory unit 20.

The communications unit 24 downloads (receives) image data and so forth from a server or the like and transmits information for download through a network. The communications unit 24 may be connected with a network in a wired or wireless manner. In the case of wired connection, Ethernet® may be employed. In a wireless case, a series of IEEE 802.11 standards (so-called wireless LAN) or a series of IEEE 802.16 standards (so-called WiMAX) may be employed.

To the slot 26, the memory card 28 as shown in FIG. 3A is connected so as to read/write image data and so forth from/to the memory card 28. Examples of the memory card 28 connectable to the slot 26 include an SD/SDHC memory card, an xD-Picture Card®, a Memory Stick®, and a Compact-Flash®.

The image displaying device 10 according to the present invention works as follows.

Figure 6:
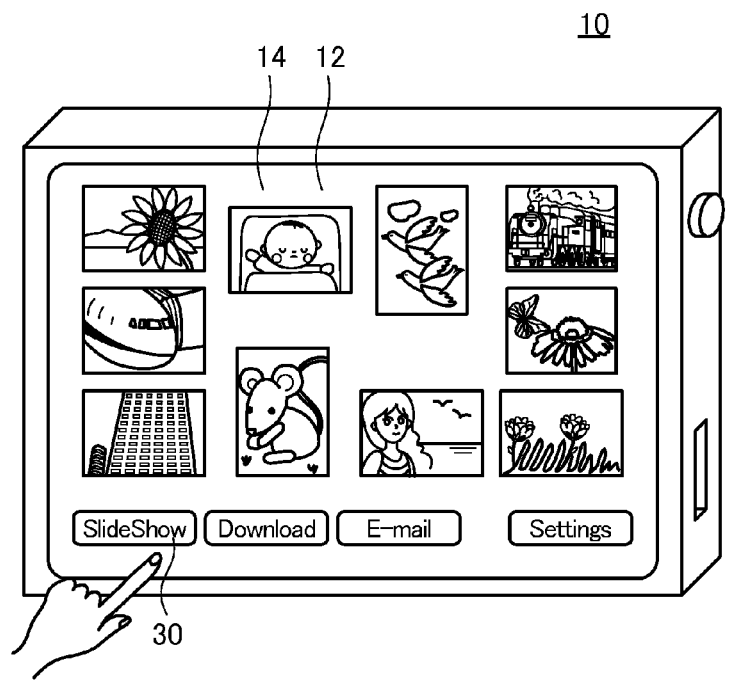
FIG. 6 is a diagram showing an example of the startup screen of the image displaying device of the present invention.

Upon application of power to the image displaying device 10, a setup screen is initially displayed on the display unit 12 as shown in FIG. 6. If an operation is selected by a user from a menu displayed on the display unit 12, a first operation signal corresponding to the selected operation is output from the first operation unit 14 as a touch panel. Exemplary operations as an alternative of the displayed menu include slideshow processing (of stored images), playback of a video, download (of image data and so forth), sending/receiving of e-mail, and settings.

As an example, it is assumed that the user selects slideshow processing and, in addition, scaling from among various image processings.

If the user touches the "Slide Show" button as displayed on the display unit 12, that is to say, touches the part of the first operation unit 14 as a touch panel that corresponds to the displayed "Slide Show" button, the first operation unit 14 outputs a first operation signal including the first coordinate information which represents the coordinate pairs of the locations at which the touch on the first operation unit 14 is detected.

The first operation signal output from the first operation unit 14 is input to the control unit 22, in which the coordinate pairs represented by the first coordinate information included in the first operation signal are compared with the coordinate pairs of locations on the displayed "Slide Show" button. If the coordinate pairs represented by the first coordinate information and the coordinate pairs on the displayed "Slide Show" button overlap each other at least partially, it is determined that the user has touched the "Slide Show" button, and a slideshow-starting signal is output.

The slideshow-starting signal output from the control unit 22 is input to the image processing unit 18, which then sequentially reads out the image data stored in the memory unit 20. The image processing unit 18 subjects the read image data to the image processing for slideshow, and outputs the image data to be displayed to the display unit 12, where a slideshow is displayed.

The scaling of an image during the slideshow is explained below in reference to FIGS. 7A, 7B, 10A and 10B, and in accordance with the flowcharts of FIGS. 8 and 9. In the following, it is assumed that the operation unit 16 on the back side is operated with the right index finger of the user, and the operation unit 14 on the front side is operated with the right thumb. The operation units may also be operated with left digits, and the operation unit 16 may also be operated with the second finger, the third finger, or the little finger.

Figure 7A:
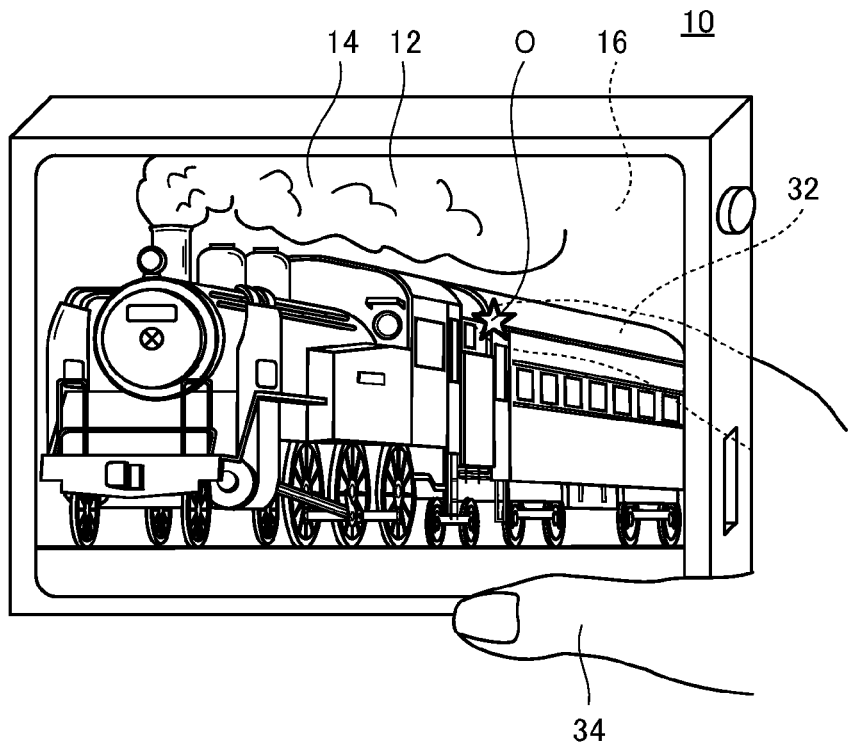
FIGS. 7A and 7B are each a diagram showing an exemplary case where image processing alternatives are displayed during the playback of image data.

During the slideshow as displayed on the display unit 12, the location at which an image displayed on the display unit 12 is to be subjected to image processing is designated by touching the first operation unit 14 mounted on the display unit 12 with the thumb 34, as shown in FIG. 7A. Upon the touch, a first operation signal is output from the first operation unit 14. On the other hand, a second operation signal is output from the second operation unit 16 on the back side upon the touch of the right index finger 32 on the operation unit 16. Under the situation as such, the thumb 34 and the finger 32 are supporting the image displaying device 10 on its front and back sides (step S0 in FIG. 8).

Owing to the characteristics of human digits, the user can input to the second operation unit 16 on the back side with the index finger 32 the location which accurately corresponds to the location designated at will with the thumb 34 (the input location being named "O" and hereafter referred to as "reference point O," with the coordinate pair thereof being referred to as "third coordinate pair"). The touches of the thumb 34 and the index finger 32 may or may not occur at a time, and either may be earlier.

After the designation of a location, the thumb 34 is preferably kept away from the display unit 12 and the first operation unit 14 such that it supports the image displaying device 10 by holding the device frame, for instance, without blocking the slideshow from view.

When the location at which image processing is to be performed has been designated with the thumb 34, in order to prevent input error, it is determined whether or not the coordinate pairs input with the index finger 32 which are represented by the second coordinate information input from the second operation unit 16 correspond to the coordinate pairs input with the thumb 34 which are represented by the first coordinate information input from the first operation unit 14 (step S1). It may be determined that the coordinate pairs input with the index finger 32 correspond to the coordinate pairs input with the thumb 34 if coordinate pairs not lower in number than specified overlap between those represented by the first coordinate information and those represented by the second coordinate information, or, for higher accuracy's sake, if not less than 50% coordinate pairs overlap between those represented by the first coordinate information and those represented by the second coordinate information.

It is also possible in order to prevent input error to consider the coordinate pairs input with the index finger 32 as corresponding to the coordinate pairs input with the thumb 34 if the period of time from the input of the first operation signal to the input of the second operation signal, or vice versa, is as specified (one second or shorter, for instance).

Figure 7B:
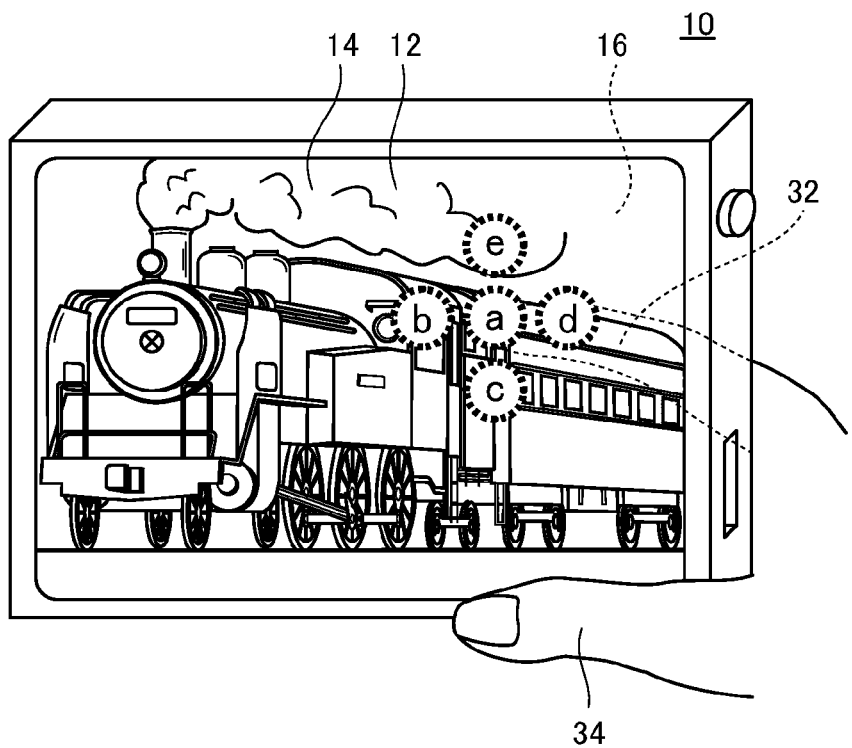

In the control unit 22 having received the second operation signal, the second coordinate information is extracted from the second operation signal, and an image processing menu-displaying signal is output so that, as shown in FIG. 7B, executable image processing alternatives listed on a selection screen for selecting one image processing from a plurality of specified image processings (image processing menu; shown in FIG. 7B as spots a to e) may be displayed at a location on the display unit 12 (namely, location on the first operation unit 14) in a layered manner, with the location being denoted by a coordinate pair equivalent to a coordinate pair represented by the second coordinate information.

In the image processing unit 18 having received the image processing menu-displaying signal, data for the layered display (superimposed display) of image processing alternatives (image processing menu) on the slideshow image data is generated and output to the display unit 12, which then displays the received data (step S2). In other words, the image processing menu is overlaid on the slideshow.

If the user selects one from the alternatives of the image processing menu as displayed, that is to say, the thumb 34 of the user touches the part of the first operation unit 14 which corresponds to one of the image processing alternatives as displayed on the display unit 12 and a first operation signal is output accordingly (the case of "Y" in step S3), the coordinate pairs represented by the first coordinate information included in the first operation signal are compared in the control unit 22 with the coordinate pairs on the individual alternatives of the image processing menu to determine which alternative has been selected (step S4). In other words, if the user selects "scaling" from the alternatives of the image processing menu as displayed, it is determined in the control unit 22 that the "scaling" alternative has been selected (step S4), and the device 10 enters the scaling mode (step S5).

If the user does not touch any alternative of the image processing menu (the case of "N" in step S3), it is determined whether or not the touch of the index finger 32 on the back side (on the second operation unit 16) is continued, with a continued touch causing the procedure to return to step S3 (the case of "Y" in step S10). If the touch of the index finger 32 on the back side (on the second operation unit 16) is not continued (the case of "N" in step S10), it is determined that the user stopped selecting an image processing, and the display of the alternatives of image processing menu is terminated to return to the slideshow (step S11). In the case where the slideshow (playback of image data) was suspended during the layered display of the alternatives of image processing menu, the slideshow (playback of image data) is restarted.

Figure 9:
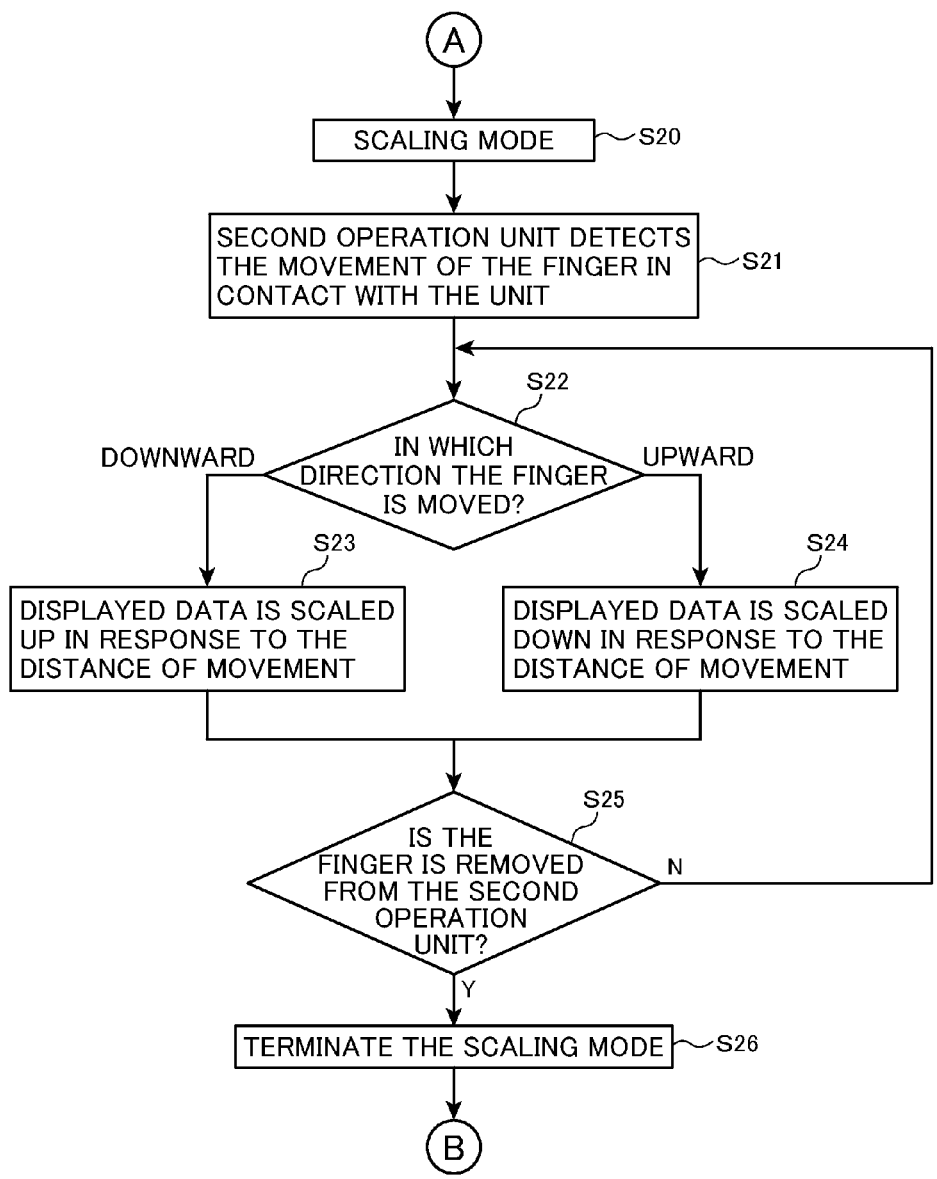
FIG. 9 is a flowchart showing an example of the image processing in scaling mode as selected during the playback of image data.
Figure 10A:
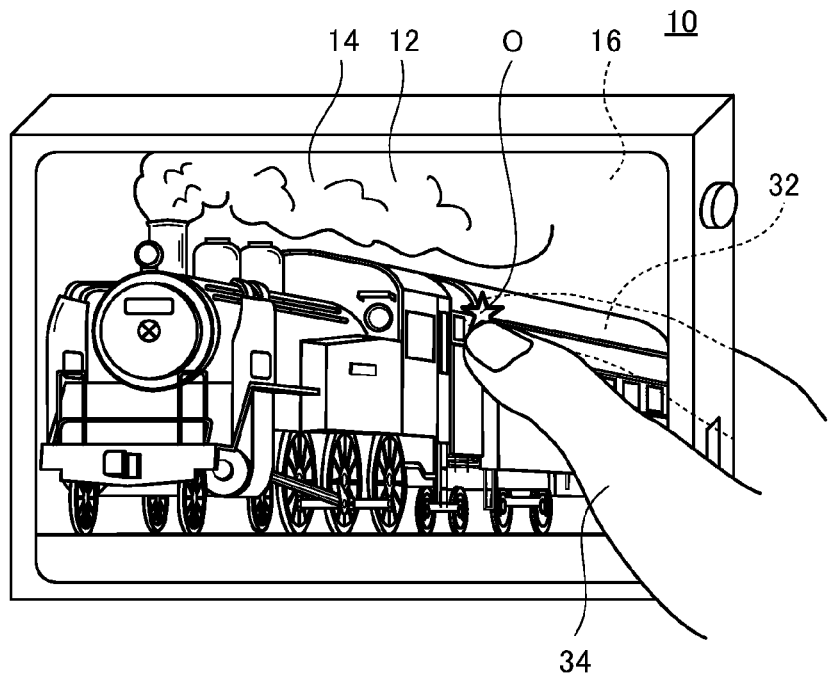
FIG. 10A is a diagram showing an example of the state immediately after the image processing in scaling mode is selected.

FIG. 10A shows the state immediately after the scaling mode is selected (step S20 in FIG. 9). Assuming that the "scaling" alternative is displayed at the spot a in FIG. 7B, the state as shown is such that the reference point O is pinched between the index finger 32 and the thumb 34 almost directly opposite to each other, that is to say, the index finger 32 touches the second operation unit 16 at the reference point O, while the thumb 34 is put on the display unit 12 and the first operation unit 14 at the point which is identical in coordinate pair to the reference point O.

Figure 10B:
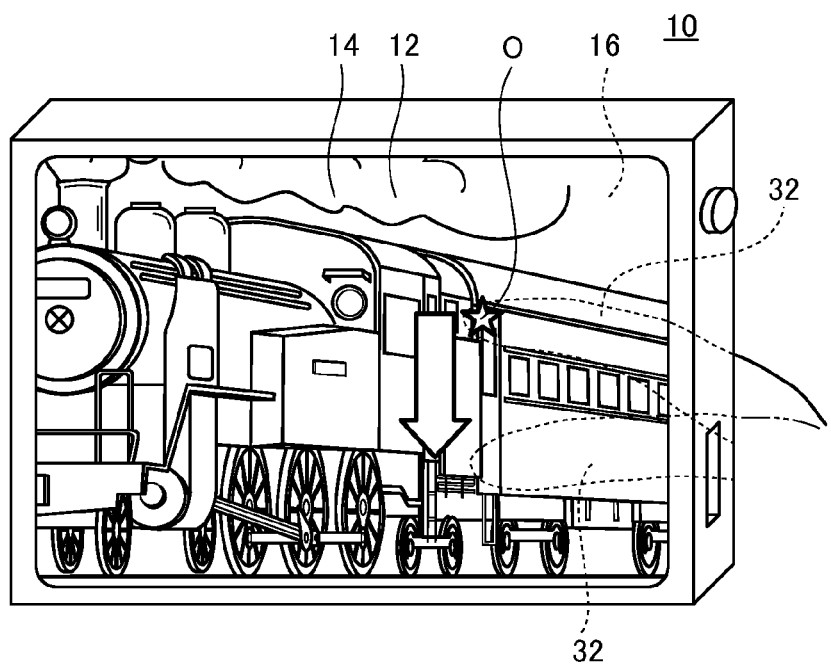
FIG. 10B is a diagram illustrating an exemplary method of inputting the amount of enlargement/reduction after the input of the reference point.

In order to carry out the scaling, the user removes the thumb 34 from the display unit 12 and the first operation unit 14, and uses the index finger 32 in contact with the second operation unit 16 for the scaling (step S21). For instance, if the index finger 32 is moved toward the bottom of the display screen as shown in FIG. 10B (the case of "DOWNWARD" in step S22), the displayed image data is scaled up around the reference point O as the center of enlargement in response to the distance covered by the index finger 32 (step S23). Similarly, if the index finger 32 is moved toward the top of the display screen (the case of "UPWARD" in step S22), the displayed image data is scaled down around the reference point O as the center of reduction in response to the distance covered by the index finger 32 (step S24).

If the index finger 32 is removed from the second operation unit 16 after the scaling up or down in response to the distance covered by the index finger 32 (the case of "Y" in step S25), the image processing in scaling mode is terminated (step S26) to return to the slideshow.

If the index finger 32 is not removed from the second operation unit 16 (the case of "N" in step S25), the procedure returns to step S22 to wait for the next motion of the finger 32, which enables successive scaling.

What is described above is nothing but an example. Accordingly, the image processing menu to be displayed in step S2 in a layered (overlaid) manner may be translucent, or an image processing alternative more likely to be selected may be arranged in the center of the menu (at the spot a in FIG. 7B).

In order to make the manipulation with a thumb easier, the image processing menu may be displayed near a lateral end (the right end if the right thumb is used) of the display screen as compared with the reference point O.

The reference point O may be a coordinate point approximately in the center of one or more coordinate points within the part of the first operation unit 14 that is touched by the thumb 34, or a location approximately in the center of the locations within the part of the second operation unit 16 that is touched by the finger 32.

The trigger for the display of the image processing menu during the slideshow as displayed is not limited to the touch of the index finger 32 on the second operation unit 16. Tapping the finger 32 on the unit 16 specified times within a certain period of time (about two seconds), or keeping the finger 32 in contact with the same part of the unit 16 for a certain period of time (about two seconds) will also do as the trigger.

If the user selects in step S4 an image processing alternative displayed at a spot other than the spot a (namely, the spot b, c, d or e) in FIG. 7B by moving the thumb 34 alone, the thumb 34 will no more touch the first operation unit 14 at a location corresponding to the location at which the index finger 32 touches the second operation unit 16. The index finger 32 may temporarily be removed from the second operation unit 16 after the selection of an image processing alternative so as to input a new reference point O by means of the thumb 34 and the index finger 32, or alternatively, to newly input the original reference point O at which the index finger 32 touched the second operation unit 16.

If a new reference point O is to be input, it is also possible to input the location which is denoted by a coordinate pair approximately in the center of the coordinate pairs overlapping between the coordinate pairs represented by the first coordinate information included in the first operation signal (coordinate pairs on the part of the first operation unit 14 that is touched by the thumb 34) and the coordinate pairs represented by the second coordinate information included in the second operation signal (coordinate pairs on the part of the second operation unit 16 that is touched by the index finger 32), or the location which is denoted by a coordinate pair approximately in the center of the coordinate pairs represented by the first or second coordinate information.

When the alternatives of image processing menu are being displayed, the index finger 32 may be kept in contact with the second operation unit 16 and moved as such to the location corresponding to the spot b, c, d or e, or alternatively, removed from the second operation unit 16 temporarily as long as the removal is not longer in time period than predetermined. If the index finger 32 is not brought again into contact with the second operation unit 16 at or near the location corresponding to the spot b, c, d or e even after the lapse of a predetermined time of about two seconds, for instance, the image processing menu may be cleared to return to the initial slideshow with the determination that the user stops image processing. It is also possible to select, with the index finger 32, an alternative of the image processing menu as newly overlaid on the slideshow.

The image processing menu as displayed may be moved in accordance with the movement of the index finger 32, whereupon the location of the index finger 32 at the time when an image processing is selected may be employed as the reference point O.

The alternatives of the image processing menu may not be displayed if they are allocated in advance to the zones above, below, on the right of, and on the left of the reference point O, respectively.

During the scaling in steps S22 to S24, the index finger 32 may be moved upward and downward in a reverse manner to the example as described above, or moved laterally. In addition, the first operation unit 14 on the front side may be used for the scaling instead of the second operation unit 16 on the back side used in the embodiment of FIG. 10B.

The scaling may also be carried out by removing the index finger 32 from the second operation unit 16 and, in a certain time (about two seconds, for instance), bringing the finger 32 again into contact with the unit 16 but at a different location, so as to perform scaling up or down in accordance with the distance and direction of the movement of the index finger 32 from the location at which the finger 32 touched the second operation unit 16 before the temporary removal to the location at which the finger 32 touches the unit 16 after the removal.

The scaling magnification may be specified in accordance with the tapping of the index finger 32 on the second operation unit 16, as well as the distance of the movement of the finger 32. For instance, tapping two times allows twofold scaling up and tapping three times allows 0.5-fold scaling down, or tapping two times on a right-hand portion of the second operation unit 16 allows twofold scaling up and tapping two times on a left-hand portion allows 0.5-fold scaling down. It is also possible to specify the scaling magnification in line with the count of tapping such that tapping two times allows twofold scaling, tapping three times allows threefold scaling, and so forth.

During the scaling, the aspect ratio of the image data as displayed may or may not be changed. For instance, scaling may be effected only in the direction in which the operating finger is moved (with the aspect ratio being thus changed), or only in lateral directions in the case of tapping on a right-hand portion of the second operation unit 16 and only in vertical directions in the case of tapping on a left-hand portion.

The scaling is not necessarily carried out around the reference point O as the center, but the center of the image data as displayed may be used as the reference point of scaling.

If there exist a plurality of coordinate pairs overlapping between those represented by the first coordinate information and those represented by the second coordinate information, one of the locations denoted by the overlapping coordinate pairs which is most approximate to the center of the locations may be used as the reference point O.

The determination whether or not the image processing in scaling mode is to be terminated (step S25) may be made a specified time (about two seconds) after the index finger 32 is removed from the second operation unit 16.

At the end of the image processing in scaling mode (step S26), the image as displayed may be kept scaled up/down or recovered from a scaled-up/down state.

With respect to other image processings, the image displaying device 10 works as described below.

Examples of other image processings include image processings in plane rotation mode (step S6 in FIG. 8), z-axis rotation mode (step S7), specified-area emphasizing mode (step S8), and playback environment modifying mode (step 9), which are explained in reference to FIGS. 11A and 11B, 12A and 12B, 13A and 13B, as well as 14A and 14B, respectively. In each case, the relevant image processing is selected in an analogous manner to the case of scaling mode, and the procedure flow after the selection of the image processing is also analogous in principle, so that the following explanation is simplified.

Figure 11A:
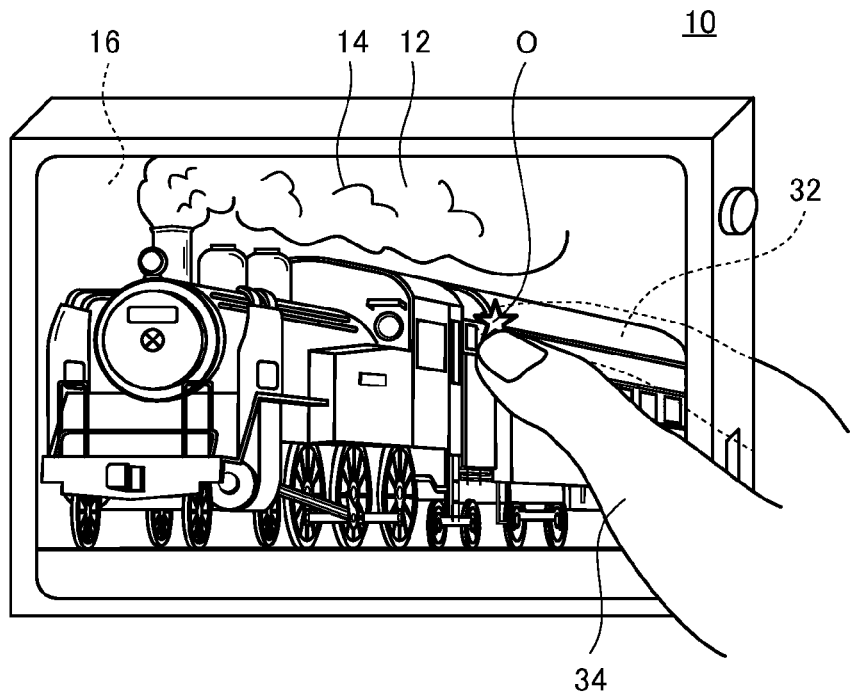
FIG. 11A is a diagram showing an example of the state immediately after the image processing in plane rotation mode is selected.

FIG. 11A shows the state immediately after the plane rotation mode is selected (state immediately after step S6 in FIG. 8), in which the reference point O is pinched between the index finger 32 and the thumb 34 almost directly opposite to each other.

Figure 11B:
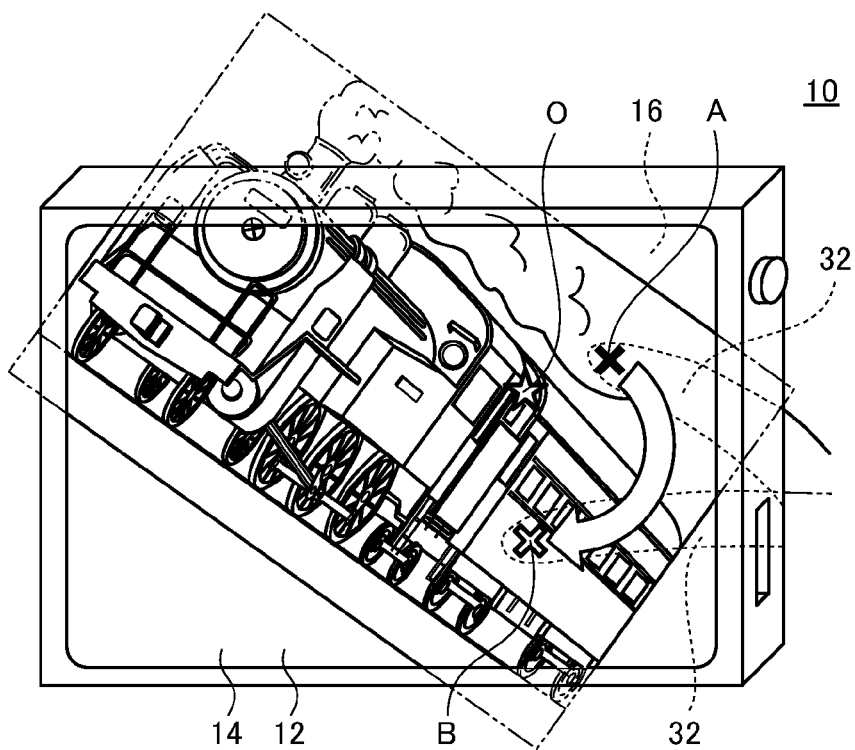
FIG. 11B is a diagram illustrating an exemplary method of inputting the direction of plane rotation after the input of the reference point.

As seen from FIG. 11B, in order to carry out the plane rotation, the user initially removes the thumb 34 from the display unit 12 and the first operation unit 14. Next, the index finger 32 touching the second operation unit 16 is temporarily removed from the second operation unit 16 and, within a short time (about two seconds), brought again into contact with the second operation unit 16. The location at which the index finger 32 touches the unit 16 again is referred to as "operation point A" (having a coordinate pair referred to as "fourth coordinate pair").

The index finger 32 in contact with the second operation unit 16 is moved from the operation point A to the location which is to be referred to as "operation point B" (having a coordinate pair referred to as "fifth coordinate pair"). As a result, the image data is rotated, clockwise as viewed from the front side, about the reference point O as the center of rotation by the angle $\angle$ AOB between the line segment OA defined by the reference point O and the operation point A and the line segment OB defined by the reference point O and the operation point B.

After the plane rotation by an angle in response to the movement of the index finger 32, the image processing in plane rotation mode is terminated to return to the slideshow if the index finger 32 is removed from the second operation unit 16.

If the index finger 32 is not removed from the second operation unit 16, the device 10 goes into the state of waiting for the next motion of the finger 32, which enables successive plane rotation.

If the operation points A and B are designated conversely, that is to say, the index finger 32 in contact with the second operation unit 16 is moved from the location as the point B to the location as the point A in the figure, the image data is rotated counterclockwise as viewed from the front side.

The operation points A and B may also be designated with the thumb 34 touching the first operation unit 14. In that case, the location at which the index finger 32 touches the unit 16 can be used as the reference point O.

During the plane rotation, the angle of rotation may be specified in accordance with the count of tapping of the index finger 32 on the second operation unit 16. For instance, tapping once may allow a clockwise rotation by 45 degrees. The count of tapping, the angle of rotation, and the direction of rotation are selected in any combination.

The determination whether or not the image processing in plane rotation mode is to be terminated may be made a specified time (about two seconds) after the index finger 32 is removed from the second operation unit 16.

Figure 12A:
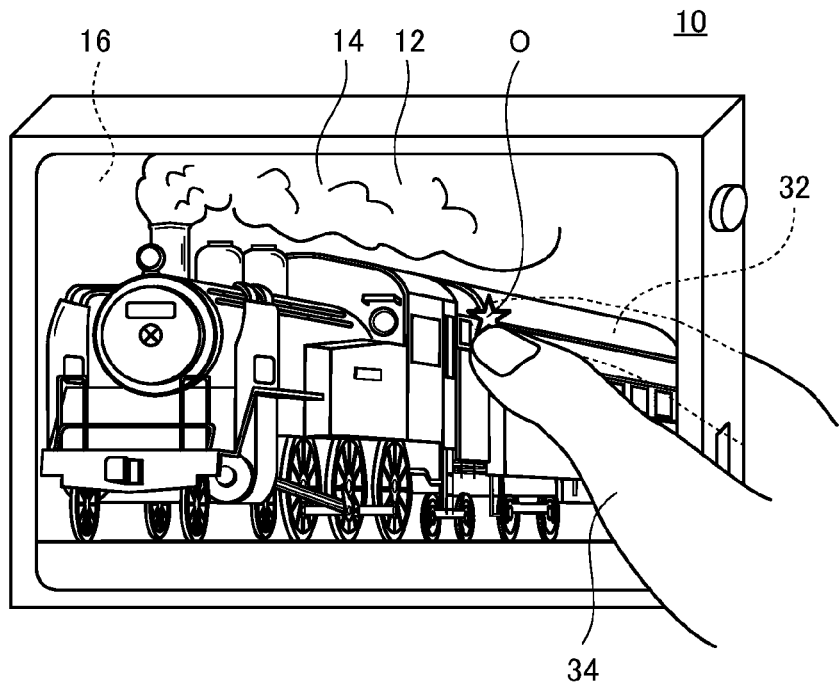
FIG. 12A is a diagram showing an example of the state immediately after the image processing in z-axis rotation mode is selected.

FIG. 12A shows the state immediately after the z-axis rotation mode is selected (state immediately after step S7 in FIG. 8), in which the reference point O is pinched between the index finger 32 and the thumb 34 almost directly opposite to each other.

Figure 12B:
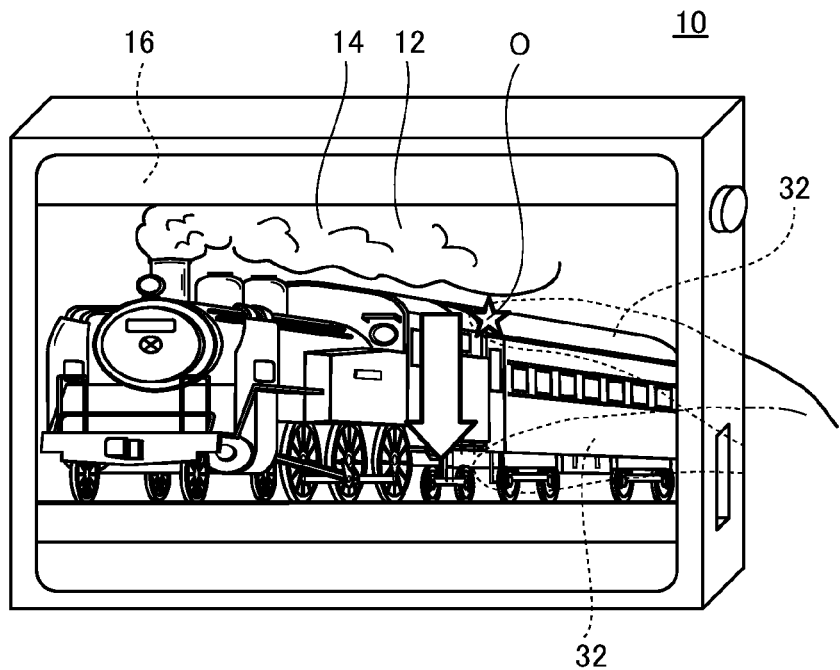
FIG. 12B is a diagram illustrating an exemplary method of inputting the direction and amount of z-axis rotation after the input of the reference point.

As seen from FIG. 12B, in order to carry out the z-axis rotation, the user initially removes the thumb 34 from the display unit 12 and the first operation unit 14. Next, the index finger 32 in contact with the second operation unit 16 is moved from the reference point O at which the finger 32 touches the unit 16 toward the bottom of the display screen, and the image data as displayed is rotated about the x axis by an angle in response to the distance covered by the index finger 32 as if the z axis was rotated about the x axis.

After the z-axis rotation in response to the distance covered by the index finger 32, the image processing in z-axis rotation mode is terminated to return to the slideshow if the index finger 32 is removed from the second operation unit 16.

If the index finger 32 is not removed from the second operation unit 16, the device 10 goes into the state of waiting for the next motion of the finger 32, which enables successive z-axis rotation.

If the index finger 32 in contact with the second operation unit 16 is moved from the reference point O at which the finger 32 touches the unit 16 toward the top of the display screen, the image data as displayed is also rotated about the x axis by an angle in response to the distance covered by the index finger 32 but in the reverse direction.

The index finger 32 touching the second operation unit 16 may temporarily be removed from the second operation unit 16 and, within a short time (about two seconds), brought again into contact with the second operation unit 16. In that case, the reference point O is preferably the location at which the index finger 32 touched the unit 16 before the temporary removal.

The z-axis rotation may be instructed by moving the thumb 34 in contact with the first operation unit 14 vertically. In that case, the location at which the index finger 32 touches the unit 16 may be used as the reference point O.

The z-axis rotation may also be instructed by the movement of a digit in given directions, whereupon the image data as displayed is rotated in the forward or backward direction with respect to an axis passing through the reference point O by an angle in response to the amount (distance) of movement in the direction in question.

During the z-axis rotation, the angle of rotation may be specified in accordance with the count of tapping of the index finger 32 on the second operation unit 16. For instance, tapping two times may allow a rotation by 45 degrees. The count of tapping, the angle of rotation, and the direction of rotation are selected in any combination.

The determination whether or not the image processing in z-axis rotation mode is to be terminated may be made a specified time (about two seconds) after the index finger 32 is removed from the second operation unit 16.

Figure 13A:
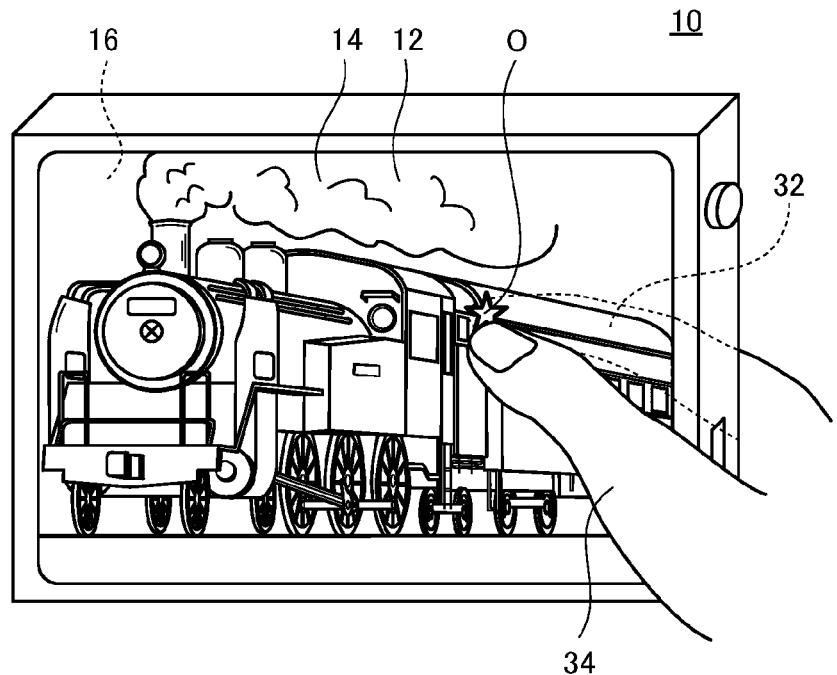
FIG. 13A is a diagram showing an example of the state immediately after the image processing in specified-area emphasizing mode is selected.

FIG. 13A shows the state immediately after the specified-area emphasizing mode is selected (state immediately after step S8 in FIG. 8), in which the reference point O is pinched between the index finger 32 and the thumb 34 almost directly opposite to each other.

Figure 13B:
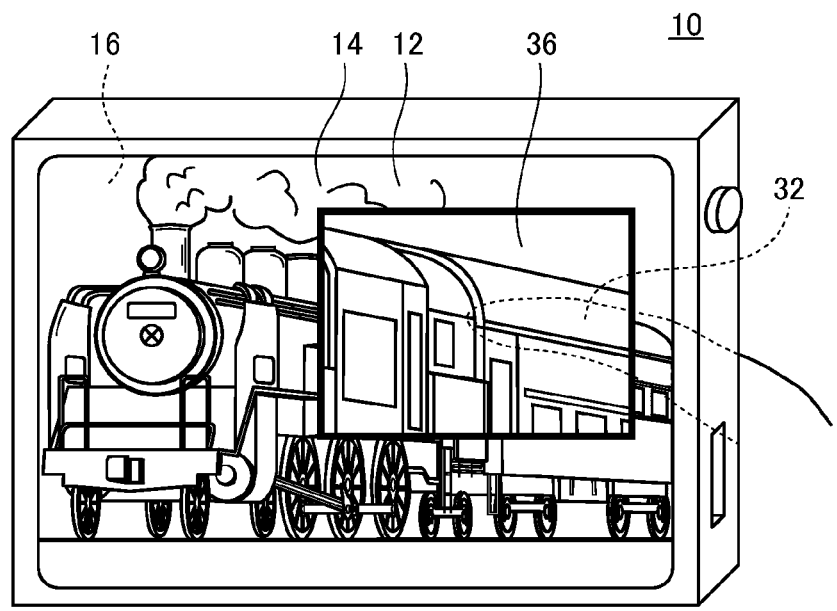
FIG. 13B is a diagram showing an example of the area to be emphasized after the input of the reference point.

As seen from FIG. 13B, in order to carry out the emphasizing of a specified area, the user initially removes the thumb 34 from the display unit 12 and the first operation unit 14. Next, a certain part (in a rectangular shape, for instance) of the image data as displayed whose center is positioned at the coordinate point at which the index finger 32 touches the second operation unit 16 (the reference point O) is zoomed in as a specified area (focused area) 36.

The center of the specified area 36 is shifted by moving the index finger 32 in contact with the second operation unit 16, which enables any part of the image data to be zoomed in as the specified area 36. The specified area 36 is thus movable in accordance with the movement of the index finger 32, that is to say, any part of the image data as displayed can be zoomed in by changing the coordinate pair of the reference point O in accordance with the second operation signal.

After the zooming in of the specified area 36 having its center positioned at the location at which the index finger 32 touches the second operation unit 16, the image processing in specified-area emphasizing mode is terminated to return to the slideshow if the index finger 32 is removed from the second operation unit 16.

If the index finger 32 is not removed from the second operation unit 16, the device 10 goes into the state of waiting for the next motion of the finger 32, which enables successive emphasizing of a specified area.

A part having its center positioned at the location at which a left finger (index finger, for instance) touches the second operation unit 16 may be designated as another specified area 36. In that case, the specified area 36 designated with the right finger may be displayed along with that designated with the left finger, or cleared when the latter is displayed.

It is also possible that the specified area 36 has its center positioned at an intermediate location between the locations at which the right and left fingers touch the second operation unit 16, respectively. The intermediate location varies as either finger is moved, resulting in the movement of the specified area 36.

The zooming magnification may be specified in response to the distance between the locations at which two fingers touch the second operation unit 16, respectively. For instance, a longer distance may allow a higher magnification and a shorter distance may allow a lower magnification.

The emphasizing method is not limited to the zooming in described above as an example, and the specified area 36 may be emphasized by color conversion, such as monochrome conversion, color inversion, and change of contrast. In the case of the video as played back, the specified area 36 may exclusively be changed in playback speed. It is also possible to combine such emphasizing methods. Parameters such as color and playback speed may be specified in response to the distance between the locations at which the two fingers touch the second operation unit 16, respectively.

The specified area 36 may be of any shape, that is to say, in the shape of a quadrangle such as square and rectangle, a circle, an ellipse, or the like.

The coefficient of emphasis may be increased gradually in proportion to the period of time for which the index finger 32 touches the second operation unit 16 at one location. As an example: Some part is found by moving the index finger 32 as the one to be emphasized, and the index finger 32 is caused to rest at a location in the part. If the index finger 32 continues touching the unit 16 at the above location for a certain period of time (one second, for instance), that is to say, the coordinate pair denoting the location at which the index finger 32 touches the second operation unit 16 does not change for a certain period of time, the specified area 36 whose center is positioned at the location at which the finger 32 is caused to rest is then emphasized with a coefficient increased with time.

The image processing in specified-area emphasizing mode may be terminated at the time when, or a certain time (three seconds, for instance) after, the index finger 32 is removed from the second operation unit 16. In addition, the image processing in specified-area emphasizing mode may be terminated while gradually decreasing the coefficient of emphasis.

Figure 14A:
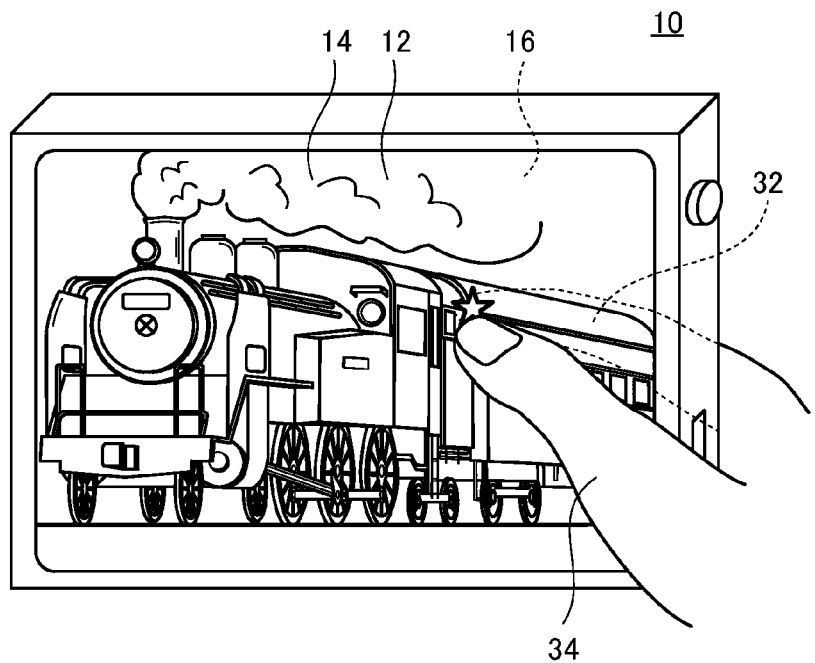
FIG. 14A is a diagram showing an example of the state immediately after the image processing in playback environment modifying mode is selected.

FIG. 14A shows the state immediately after the playback environment modifying mode is selected (state immediately after step S9 in FIG. 8), in which the reference point O is pinched between the index finger 32 and the thumb 34 almost directly opposite to each other.

Figure 14B:
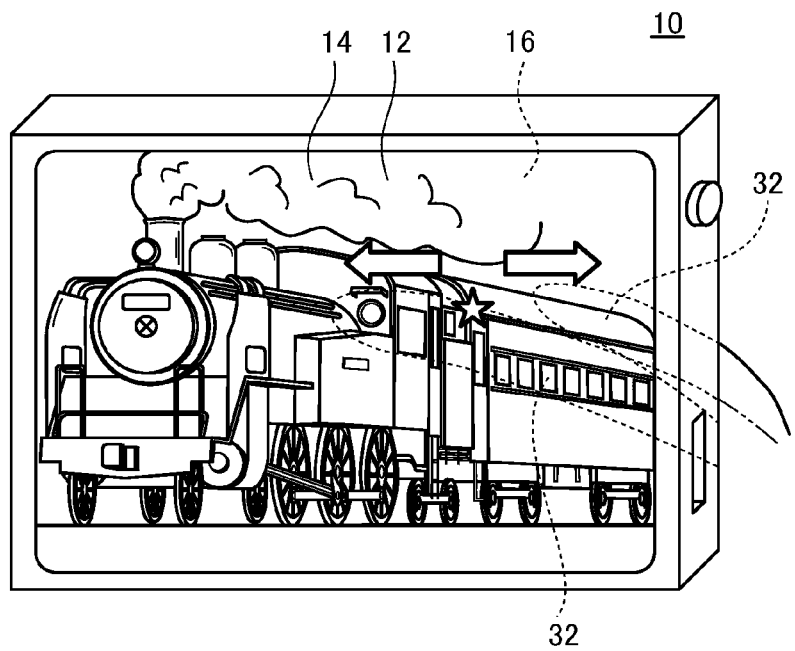
FIG. 14B is a diagram illustrating an exemplary action for the fast forward or rewind after the input of the reference point.

As seen from FIG. 14B, in order to carry out the modification of playback environment, the user initially removes the thumb 34 from the display unit 12 and the first operation unit 14. Next, from the coordinate point at which the index finger 32 touches the second operation unit 16 (reference point O), the index finger 32 in contact with the second operation unit 16 is moved rightward so as to allow the fast forward of the slideshow in response to the distance covered by the index finger 32, or moved leftward so as to allow the rewind of the slideshow in response to the distance covered by the index finger 32.

After the fast forward or rewind of the slideshow in response to the distance covered by the index finger 32, the image processing in playback environment modifying mode is terminated to return to the slideshow if the index finger 32 is removed from the second operation unit 16.

If the index finger 32 is not removed from the second operation unit 16, the device 10 goes into the state of waiting for the next motion of the finger 32, which enables successive fast forward or rewind of the slideshow.

The modification of playback environment may be instructed with the thumb 34 operating the first operation unit 14. Clockwise turning of the thumb 34 around the reference point O may allow the fast forward of the slideshow in response to the turning speed, while counterclockwise turning of the thumb 34 may allow the rewind of the slideshow in response to the turning speed. The movement of the turned thumb 34 may be detected in a similar manner to the case of the plane rotation mode as described before, and the turning speed may be determined from the distance between the locations occupied by the thumb 34 before and after the turning, and the time take for the movement. In addition, the slideshow can be displayed at a speed lower than usual by reducing the turning speed of the thumb 34.

The playback speed may be specified in accordance with the count of tapping of the index finger 32 on the second operation unit 16. For instance, tapping two times on a right-hand portion of the second operation unit 16 may allow a fast forward at a twofold higher speed, and tapping three times on a left-hand portion may allow a rewind at a threefold higher speed. The count of tapping and the playback speed are selected in any combination.

During the modification of slideshow playback environment, adjustment of playback sound level may be performed as well as the fast forward and rewind. In that case, moving upward the index finger 32 in contact with the second operation unit 16 may allow a higher sound level in response to the distance covered by the finger 32, and moving downward of the finger 32 may allow a lower sound level in response to the distance covered by the finger 32.

The determination whether or not the image processing in playback environment modifying mode is to be terminated may be made a specified time (about two seconds) after the index finger 32 is removed from the second operation unit 16.

While the above description is made on the case of a slideshow, fast forward and rewind can also be performed on a video.

According to the present invention, the steps of the image manipulating method as described above may be constructed as an image manipulating program to be implemented by a computer, or an image manipulating program for making a computer serve as various means for implementing the steps of the image manipulating method or as various means constituting the image displaying device as described above.

The present invention may also have the configuration in which such an image manipulating program as above is stored in a medium or memory in a computer-readable form.

The image displaying device as well as method and program for image manipulation of the present invention are in no way limited to the embodiments as described above in detail. Various improvements and modifications can be made within the scope of the invention.

What is claimed is:

1. An image displaying device, comprising:
   a display unit for displaying images;
   a first touch panel arranged on a display screen of the display unit and adapted to detect a touch on a surface of the first touch panel to generate first coordinate information representing a coordinate pair denoting a location of the touch;
   a second touch panel arranged at the rear of the display screen of the display unit and adapted to detect a touch on a surface of the second touch panel to generate second coordinate information representing a coordinate pair denoting a location of the touch;
   a control unit adapted to display a selection screen for selecting one image processing from a plurality of image processings to be displayed in a layered manner on said display unit at a user-selected location denoted by a first coordinate pair,
   the control unit further adapted to detect concurrent touches on the surfaces of the first and second touch panels based on the first coordinate information and the second coordinate information and, when the concurrent touches are detected, detect coordinate pairs overlapping between first coordinate pairs represented by the first coordinate information and second coordinate pairs represented by the second coordinate information to determine whether or not the overlapping coordinate pairs exist in a number not lower than specified and, when the overlapping coordinate pairs exist in a number not lower than specified, to further cause the display of the selection screen for selecting one image processing from a plurality of image processings at the user-selected location denoted by a first coordinate pair, and select one image processing from a plurality of image processings listed on the selection screen in accordance with first coordinate information generated when the image processing is selected by a user from the image processings on the selection screen, wherein touching by a user determines a display location of the selection screen in that i) in a first instance the first coordinate pair being at a first location causes the selection screen to be displayed at the first location and ii) in a second instance the first coordinate pair being at a second location causes the selection screen to be displayed at the second location, the first and second locations being different; and
   an image processing unit adapted to use one or both of the first coordinate information and second coordinate information to subject an image displayed on the display unit to image processing as selected.

2. The image displaying device according to claim 1, wherein said control unit detects coordinate pairs overlapping between said first coordinate pairs and said second coordinate pairs and determines whether or not the overlapping coordinate pairs exist in a number not lower than specified when a period of time from generation of said first coordinate information representing a first coordinate pair to generation of said second coordinate information representing a second coordinate pair or a period of time from the generation of said second coordinate information representing a second coordinate pair to the generation of said first coordinate information representing a first coordinate pair is equal to or shorter than a predetermined period of time.

3. The image displaying device according to claim 1, wherein said image processing comprises at least one out of scaling of an image, plane rotation of an image, z-axis rotation of an image, emphasizing of a specified area, and modification of playback environment.

4. The image displaying device according to claim 3, wherein, when the scaling of an image is selected by said control unit, said image processing unit scales up or down an image based on second coordinate information generated through a movement of an operating means in contact with said second touch panel in a first direction or a direction opposite to the first direction.

5. The image displaying device according to claim 3, wherein, when said plane rotation of an image is selected, said image processing unit rotates an image in a plane about a center of rotation having a third coordinate pair represented by second coordinate information generated through a touch of an operating means on said second touch panel by an angle defined by the center of rotation as well as points having fourth and fifth coordinate pairs, respectively, based on second coordinate information generated through a movement, from the point with the fourth coordinate pair to the point with the fifth coordinate pair, of the operating means in contact with the second touch panel that has been removed temporarily from the second touch panel and brought again into contact with the second touch panel.

6. The image displaying device according to claim 3, wherein, when said z-axis rotation of an image is selected, said image processing unit subjects an image to z-axis rotation based on second coordinate information generated through a movement of an operating means in contact with said second touch panel in a first direction or a direction opposite to the first direction.

7. The image displaying device according to claim 3, wherein, when said emphasizing of a specified area is selected, said image processing unit subjects a specified area of an image whose center is positioned at a location denoted by a coordinate pair represented by second coordinate information generated through a touch of an operating means on said second touch panel, to one processing selected from among zooming, color conversion, color inversion, contrast adjustment, and change of playback speed.

8. The image displaying device according to claim 3, wherein, when said modification of playback environment is selected, said image processing unit performs fast forward or rewind of images or adjustment of playback sound level based on second coordinate information generated through a movement of an operating means in contact with said second touch panel in a first direction or a direction opposite to the first direction.

9. The image displaying device according to claim 1, wherein each of said first and second touch panels detects a touch of an operating means on the surface of the relevant panel when the operating means is tapped on the surface specified times within a certain period of time.

10. The image displaying device according to claim 1, wherein each of said first and second touch panels detects a touch of an operating means on the surface of the relevant panel when the operating means is kept in contact with the surface for a certain period of time.

11. A method of displaying an image on an image displaying device provided with a display unit for displaying images, a first touch panel arranged on a display screen of the display unit and adapted to detect a touch on a surface of the first touch panel to generate first coordinate information representing a coordinate pair denoting a location of the touch, and a second touch panel arranged at the rear of the display screen of the display unit and adapted to detect a touch on a surface of the second touch panel to generate second coordinate information representing a coordinate pair denoting a location of the touch, comprising:
 a first step of detecting concurrent touches on the surfaces of the first and second touch panels based on the first coordinate information and the second coordinate information;
 a second step of detecting coordinate pairs overlapping between first coordinate pairs represented by the first coordinate information on one hand and second coordinate pairs represented by the second coordinate information on the other when the concurrent touches are detected; and
 a third step of causing a selection screen for selecting one image processing from a plurality of image processings to be displayed in a layered manner on said display unit at a location denoted by a first coordinate pair when said overlapping coordinate pairs exist in a number not lower than specified, selecting one image processing from a plurality of image processings listed on the selection screen in accordance with first coordinate information generated when the image processing is selected by a user from the image processings on the selection screen and using one or both of the first coordinate information generated by the first touch panel and the second coordinate information generated by the second touch panel to subject an image displayed on the display unit to image processing as selected,
 wherein touching by a user determines a display location of the selection screen in that i) in a first instance, the first coordinate pair being at a first location causes the selection screen to be displayed at the first location and ii) in a second instance, the first coordinate pair being at a second location causes the selection screen to be displayed at the second location, the first and second locations being different.

12. A non-transitory computer readable medium containing computer-executable code when executed by a computer device causes the computer device to display an image on an image displaying device provided with a display unit for displaying images, a first touch panel arranged on a display screen of the display unit and adapted to detect a touch on a surface of the first touch panel to generate first coordinate information representing a coordinate pair denoting a location of the touch, and a second touch panel arranged at the rear of the display screen of the display unit and adapted to detect a touch on a surface of the second touch panel to generate second coordinate information representing a coordinate pair denoting a location of the touch, the computer device executing:
 a first step of detecting concurrent touches on the surfaces of the first and second touch panels based on the first coordinate information and the second coordinate information;
 a second step of detecting coordinate pairs overlapping between first coordinate pairs represented by the first coordinate information on one hand and second coordinate pairs represented by the second coordinate information on the other when the concurrent touches are detected; and
 a third step of causing a selection screen for selecting one image processing from a plurality of image processings to be displayed in a layered manner on said display unit at a location denoted by a first coordinate pair when said overlapping coordinate pairs exist in a number not lower than specified, selecting one image processing from a plurality of image processings listed on the selection screen in accordance with first coordinate information generated when the image processing is selected by a user from the image processings on the selection screen and using one or both of the first coordinate information generated by the first touch panel and the second coordinate information generated by the second touch panel to subject an image displayed on the display unit to image processing as selected,
 wherein touching by a user determines a display location of the selection screen in that i) in a first instance, the first coordinate pair being at a first location causes the selection screen to be displayed at the first location and ii) in a second instance, the first coordinate pair being at a second location causes the selection screen to be displayed at the second location, the first and second locations being different.

* * * * *